(12) United States Patent
Matus (10) Patent No.: US 9,915,955 B2
(45) Date of Patent: Mar. 13, 2018

(54) EXTENSIBLE QUADROTOR BODY

(71) Applicant: Teal Drones, Inc., Salt Lake City, UT (US)

(72) Inventor: George Michael Matus, Salt Lake City, UT (US)

(73) Assignee: TEAL DRONES, INC., Salt Lake City, UT (US)

( * ) Notice: Subject to any disclaimer, the term of this patent is extended or adjusted under 35 U.S.C. 154(b) by 0 days.

(21) Appl. No.: 15/190,953

(22) Filed: Jun. 23, 2016

(65) Prior Publication Data

US 2017/0371354 A1    Dec. 28, 2017

(51) Int. Cl.
*G05D 1/08* (2006.01)
*G05D 1/10* (2006.01)
*H04B 7/185* (2006.01)
*B64C 27/32* (2006.01)
*B64C 27/08* (2006.01)
*B64C 27/52* (2006.01)

(52) U.S. Cl.
CPC ............ *G05D 1/101* (2013.01); *B64C 27/08* (2013.01); *B64C 27/32* (2013.01); *B64C 27/52* (2013.01); *H04B 7/18519* (2013.01)

(58) Field of Classification Search
CPC ........ G05D 1/101; B64C 27/08; B64C 27/32; B64C 27/52; H04B 7/18519
USPC ............... 701/1, 2, 3, 4, 5, 6–12, 106
See application file for complete search history.

(56) References Cited

U.S. PATENT DOCUMENTS

| 9,522,732 | B1 * | 12/2016 | Froloff | B64C 39/024 |
| 2006/0271248 | A1 * | 11/2006 | Cosgrove, Jr. | B64C 39/024 701/2 |
| 2014/0099853 | A1 * | 4/2014 | Condon | G05D 1/0033 446/37 |
| 2014/0336928 | A1 * | 11/2014 | Scott | G01N 21/88 701/468 |

* cited by examiner

*Primary Examiner* — Muhammad Shafi
(74) *Attorney, Agent, or Firm* — Workman Nydegger (57) ABSTRACT

Embodiments are directed to a rotor-based remote flying vehicle platform such as a quadrotor, and to methods for controlling intra-flight dynamics of such rotor-based remote flying vehicles. In one case, a rotor-based remote flying vehicle platform is provided that includes a central frame. The central frame has a control center that is configured to control motors mounted to the vehicle platform. The central frame also has a communication port configured to interface with functionality modules. The communication port is communicably connected to the control center. The rotor-based remote flying vehicle platform further includes at least a first arm that is connected to the central frame and extends outward, as well as a first motor mounted to the first arm, where the first motor is in communication with the control center. The method for controlling intra-flight dynamics may be performed on such a rotor-based remote flying vehicle.

12 Claims, 8 Drawing Sheets

EXTENSIBLE QUADROTOR BODY

BACKGROUND

1. Technical Field

Implementations described herein relate to rotor-based remote vehicles and similar types of platforms.

2. Background and Relevant Art

Unmanned aerial vehicles (UAVs) or "drones" have experienced a significant increase in public use and interest in recent years. The proposed uses for drones extend from package delivery to mapping and surveillance. The wide-ranging uses for drones has created a broad assortment of different drone configurations and models.

Conventional drones typically fall within two different categories—fixed-wing drones and rotor-based drones. Fixed-wing drones typically have an airplane shape, and require a runway to take off and land. Rotor-based drones do not require a runway to take-off and land. Instead, they orient their rotors in a manner that propels air downward, allowing for vertical landings and takeoffs. Rotor-based drones may include any number of different rotors, but a common rotor configuration includes four separate rotors. Rotor-based drones not only provide vertical takeoffs and landings, but also allow the drones to hover over a position. Furthermore, rotor-based drones are typically more maneuverable, and are significantly more capable of flying within buildings and other structures.

The increased use of rotor-based drones has also presented a need for greater flexibility within individual rotor-based drone systems. Typical rotor-based drones are limited in the components that can be used with them. Moreover, adding components may change the flight dynamics of the drone. For instance, adding a component may increase the overall weight of the drone. This may cause the drone to behave differently in the air than intended.

BRIEF SUMMARY

Embodiments described herein are directed to a rotor-based remote flying vehicle platform such as a quadrotor, and to methods for controlling intra-flight dynamics of such rotor-based remote flying vehicles. In one embodiment, a rotor-based remote flying vehicle platform includes a central frame. The central frame includes a control center that is configured to control motors mounted to the vehicle platform. The central frame also has a communication port configured to interface with functionality modules. The communication port is communicably connected to the control center. The rotor-based remote flying vehicle platform further includes at least a first arm that is connected to the central frame and extends outward, as well as a first motor mounted to the first arm, where the first motor is in communication with the control center.

In an embodiment, the method for controlling intra-flight dynamics of a rotor-based remote flying vehicle includes receiving, at a control center, an indication that a functionality module has been connected to a communication port affixed to a central frame of the rotor-based remote flying vehicle. The method next includes identifying which functionality module is connected to the communication port, and determining physical characteristics of the functionality module. The method also includes adjusting flight dynamics of the rotor-based remote flying vehicle based on the physical characteristics of the functionality module.

In another embodiment, a quadrotor is described. The quadrotor includes a central frame with a control center that is configured to control motors mounted to the quadrotor, and a communication port configured to interface with functionality modules. The communication port is communicably connected to the control center. Moreover, the control center is configured to dynamically adjust flight dynamics for the quadrotor based on physical characteristics of the functionality modules. The quadrotor also includes four arms that are connected to the central frame, each of which extends outward from the central frame, and four motors respectively mounted to four arms, where at least one of the four motors is in communication with the control center.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to a rotor-based remote flying vehicle platform such as a quadrotor, and to methods for controlling intra-flight dynamics of such rotor-based remote flying vehicles. In one embodiment, a rotor-based remote flying vehicle platform includes a central frame. The central frame includes a control center that is configured to control motors mounted to the vehicle platform. The central frame also has a communication port configured to interface with functionality modules. The communication port is communicably connected to the control center. The rotor-based remote flying vehicle platform further includes at least a first arm that is connected to the central frame and extends outward, as well as a first motor mounted to the first arm, where the first motor is in communication with the control center.

In an embodiment, the method for controlling intra-flight dynamics of a rotor-based remote flying vehicle includes receiving, at a control center, an indication that a functionality module has been connected to a communication port affixed to a central frame of the rotor-based remote flying vehicle. The method next includes identifying which functionality module is connected to the communication port, and determining physical characteristics of the functionality module. The method also includes adjusting flight dynamics of the rotor-based remote flying vehicle based on the physical characteristics of the functionality module.

In another embodiment, a quadrotor is described. The quadrotor includes a central frame with a control center that is configured to control motors mounted to the quadrotor, and a communication port configured to interface with functionality modules. The communication port is communicably connected to the control center. Moreover, the control center is configured to dynamically adjust flight dynamics for the quadrotor based on physical characteristics of the functionality modules. The quadrotor also includes four arms that are connected to the central frame, each of which extends outward from the central frame, and four motors respectively mounted to four arms, where at least one of the four motors is in communication with the control center.

Accordingly, embodiments described herein allow a rotor-based remote flying vehicle platform to be used in a wide variety of different situations and environments. Communication ports placed throughout the central frame of the rotor-based remote flying vehicle platform allow the functionality of the vehicle to be easily upgraded and extended to include functions and features that are tailored for specific situations. As such, a user can customize a rotor-based remote flying vehicle platform by simply connecting a desired functionality module to the rotor-based remote flying vehicle platform.

In the following disclosure, various implementations are described. One will understand that these examples are provided only for the sake of clarity and explanation and do not limit or otherwise confine the invention to the disclosed examples. One or more of the examples described herein are directed to a "quadrotor." One will understand that usage of the term "quadrotor" is merely for the sake of clarity and simplicity, and that the embodiments herein apply equally to all rotor-based remote flying vehicle platforms, whether they have one, two, three, four or more rotors and/or motors.

Figure 1:
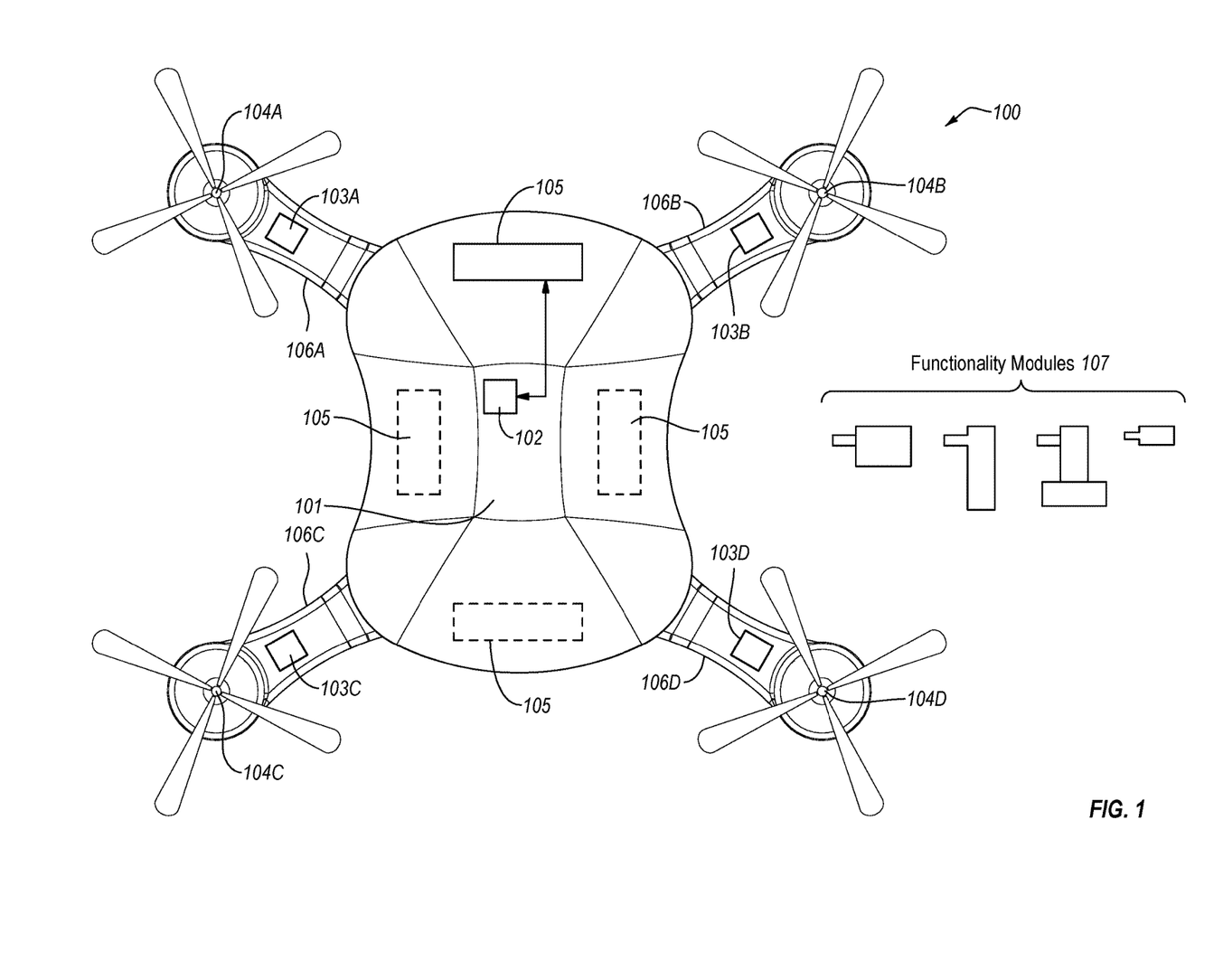
FIG. 1 illustrates an embodiment of a rotor-based remote flying vehicle platform.

Turning now to the figures, FIG. 1 illustrates a rotor-based remote flying vehicle platform 100 (or "quadrotor 100" or "platform 100" herein) with a central frame 101 and four arms 106A-D. In the embodiment illustrated in FIG. 1, each arm is attached to the central frame 101 at a corner of the frame. One will appreciate that the central frame 101 may be of substantially any shape, and that the square shape shown in FIG. 1 was chosen arbitrarily. The arms 106A-D may be attached to the central frame 101 of the quadrotor 100 using any type of fastening device, and may be attached to substantially any part of the central frame, depending on the implementation.

The depicted quadrotor 100 includes a control center 102 within the central frame 101. The control center 102 may include or may itself be a flight control unit. The flight control unit may include sensors for controlling the quadrotor 100. These sensors may include altimeters, gyroscopes, global positioning system (GPS), sonar systems, etc. The flight control unit of the control center may also include various control and processing modules including central processing units (CPUs), radios, antennas, graphics processing units (GPU), etc. In various alternate embodiments, the flight control unit and/or the control center 102 may be otherwise located or dispersed through the quadrotor 100.

As stated above, one skilled in the art will appreciate that the depicted quadrotor 100 is merely exemplary. Additional or alternate implementations may include rotor-based remote flight systems with less than four arms 106A-D or rotor-based remote flight systems with more than four arms. Additionally, various implementations may include different physical configurations, construction materials, proportions, and functional components. For instance, the rotor-based remote flight platform 100 may include communication ports (e.g. 105) that allow the addition of functionality modules 107. The functionality modules 107 may include many different types of components or devices including cameras, sonar systems, laser sights, GPS radios, infrared cameras, mesh network controllers and/or radios, wireless radios (e.g. Bluetooth or WiFi), spare batteries, gimbal devices for mounting cameras, or other types of functionality modules.

Each functionality module 107 may be shaped differently. Each functionality module may also have a different size, weight or weight distribution. As the shape, size, weight or weight distribution may have a great affect on the flight dynamics of a (typically very light) quadrotor, the control center 102 may take these physical characteristics of the functionality modules 107 into consideration when flying the platform 100. For instance, the control center 102 may be initially configured to fly the quadrotor 100 when it has no attached functionality modules. It may be preprogrammed with the weight, size and other characteristics of the quadrotor it is controlling. The control center 102 may be communicatively connected to each motor (103A-D), and as such, may control the rotor speed of each rotor (104A-D) individually.

In cases where the quadrotor 100 has tilt control at some or all of the rotors, the control center 102 may be configured to adjust the tilt of the rotors as an additional method of controlling flight dynamics. As used herein, the term "flight dynamics" refers to the quadrotor's ability to lift off the ground, hover, travel in a certain direction on any plane or combination of planes, compensate for wind, navigate around objects, or adapt to different functionality modules being attached to the quadrotor and still maintain controlled flight.

In one specific embodiment, a rotor-based remote flying vehicle platform 100 is provided. The rotor-based remote flying vehicle platform 100 includes a central frame 101. The central frame may be made out of substantially any type of material or combination of materials, and may be of substantially any size or shape. The central frame 101 includes a control center 102 that is configured to control motors mounted to the central frame of the vehicle platform 100. The motors 103A-D may be electric motors that run on battery power, or may be combustion engines that run on combustible fuels. The motors may be sized to be powerful enough to lift the platform 100 off the ground and maintain flight, while being light enough to not overly encumber the flying platform. Each motor is individually controllable, and may directly control the rate at which each motor's corresponding rotor (e.g. 104A-D) operates.

In this embodiment, the central frame 101 of the platform 100 also includes at least one communication port 105 configured to interface with functionality modules 107. The communication port may be any type of communication interface that allows a device or functionality module to communicate with the control center 102. The communication port 105 is electronically connected to the control center, and facilitates electronic communication between the various components. Different communication ports may be positioned on the central frame 101. This is more clearly shown in FIGS. 3-9, as will be explained further below. In addition to the central frame 101, the platform 100 also includes at least one arm (e.g. 106A) that is connected to the central frame 101 and extends outward away from the central frame. The platform 100 also includes at least one motor (e.g. 103A) that is mounted to the first arm 106A. The motor 103A is in communication with the control center 102. As such, the control center 102 may control how much power is applied by the motor 103A to the corresponding rotor 104A, thereby generating lift and/or directional force.

Figure 2A:
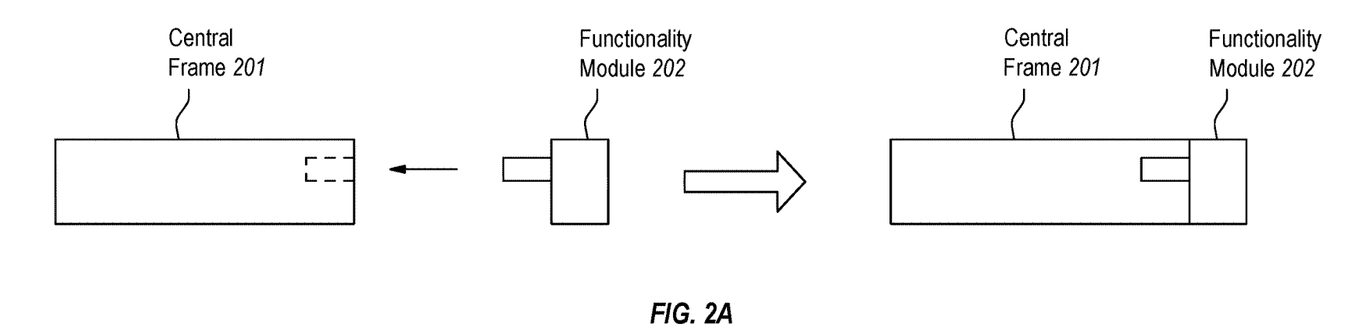
FIG. 2A illustrates an embodiment in which a functionality module is connected to a communication port on a rotor-based remote flying vehicle platform.

As shown in FIG. 1, functionality modules 107 may take on a variety of shapes, sizes and weights. Although each functionality module is shown with the same type of connector, one will recognize that different communication ports will use different connectors. Each functionality module 107 will have its own set of physical characteristics including weight, size, shape or other features. As shown in FIG. 2A, some functionality modules may align with the central frame in a flush manner. Indeed, when functionality module 202 is inserted into the central frame 201, the two align such that the functionality module 202 is flush with the central frame. This functionality module may cause little if any difference to the aerodynamics of the platform 100. However, if the functionality module is even reasonably heavy, it may have a large affect on the overall weight of the platform 100 and on its weight distribution. For instance, if the functionality module 202 is relatively heavy, the platform 100 may be imbalanced on the side where the functionality module was inserted. This imbalance will be compensated for by the control center 102 during flight.

Figure 2B:
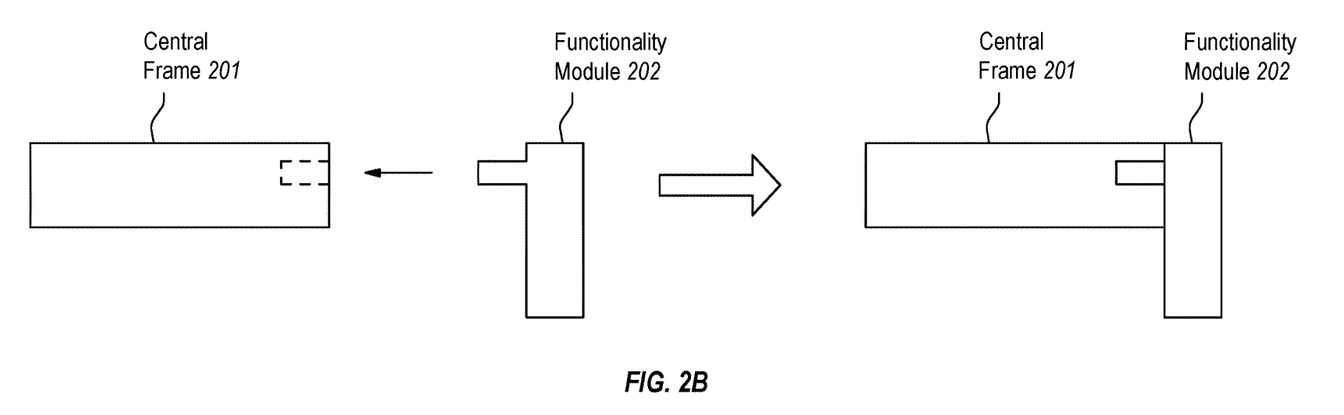
FIG. 2B illustrates an embodiment in which an alternative functionality module is connected to a communication port on a rotor-based remote flying vehicle platform.

In other cases, as shown in FIG. 2B, the functionality module 202 may be of a size or shape that does not align in a flush manner. As a result, the functionality module 202 may stick out further than the body of the platform 100. Depending on the size and/or shape of the functionality module 202, the overall aerodynamics of the platform 100 may be affected. For instance, the functionality module may introduce increased wind resistance, particularly on the side in which it was inserted into the communications port 105 of the central frame 101. This change in aerodynamics may cause subtle or large fluctuations in the flight dynamics of the flying vehicle. The control center 102 may use various sensors such as accelerometers or gyroscopes to determine if the flying vehicle is lower or higher on one side, is flying off course, is continually drifting to one side or is otherwise behaving improperly. The control center 102 may be configured to diagnose the problem and compensate by adjusting motor speed for certain motors and/or changing motor tilt angle.

Accordingly, the control center 102 may be configured to adjust flight dynamics of the rotor-based remote flying vehicle platform based on the physical characteristics of the functionality module. In some cases, the control center 102 may communicate electronically with the functionality module to identify the module and query it for its physical characteristics. For instance, once a functionality module 107 is plugged in to a communications port 105, the control center 102 may request identification information from the functionality module 107. The identification information may include an indication of the type of functionality provided by the module (e.g. infrared camera capabilities), as well as an indication of that module's physical characteristics. These physical characteristics may include its dimensions, weight, shape, surface features, drag coefficient, weight distribution within the module, or other characteristics. Once these characteristics are received by the control center 102, the control center can revise or adjust flight dynamics of the flying vehicle.

These adjustments may include altering motor speed for the any of the motors. Indeed, in some cases, the rotor-based remote flying vehicle platform 100 includes four arms 106A-D, where each arm has a motor (103A-D) mounted to it. Each arm is connected to the central frame and extends outwards. Each motor may be individually controlled, such that the speed of the rotor (104A-D) may be increased or decreased dynamically as needed. Accordingly, adjusting flight dynamics based on physical characteristics of the functionality module 107 includes altering motor speed for one, two, three or all four motors. These adjustments may be made in real-time, and may be made to specifically adjust for the functionality modules attached to the platform 100.

The functionality modules 107 may include substantially any kind of electronic device, component or module. They may, for example, include an infrared camera, a sonar system, a mesh network controller, a wireless radio, a spare battery, a digital camera or other device or system. Spare batteries may be used to extend the flight time of the platform 100. Infrared or traditional digital cameras may be used to record aspects of the platform's flight. Sonar systems may be used to send and receive sonar signals from the platform to gather data regarding current surroundings. Mesh network controllers may be used to communicate with other flying platforms or "drones." Indeed, in some cases, multiple such drones may fly together in formation to accomplish a task or to provide entertainment. The drones may communicate with one another using add-on functionality modules such as mesh network controllers. Wireless radios, such as Bluetooth, WiFi, GPS or cellular radios, may be used to communicate with wireless network hubs or with other mobile or stationary computing devices. It will be appreciated that the above-listed examples of functionality modules are merely a small portion of devices or modules that can be used in conjunction with rotor-based remote flying vehicle platform 100.

Figure 3:
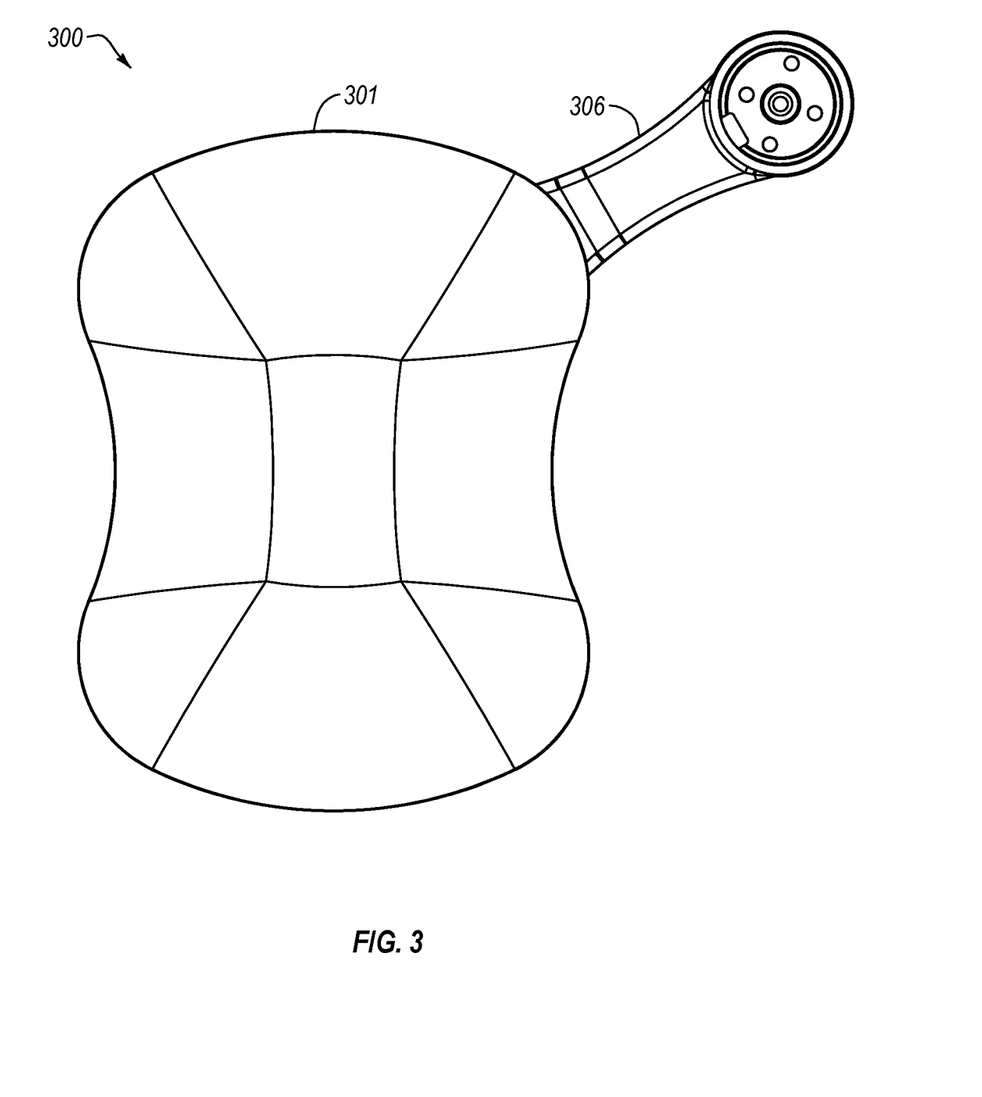
FIG. 3 illustrates a top view of an embodiment of a rotor-based remote flying vehicle platform.

FIGS. 3-9 illustrate embodiments which depict different views of a rotor-based remote flying vehicle platform, as well as different communication ports which may be used. For instance, FIG. 3 illustrates a top view of a rotor-based remote flying vehicle platform 300 with a central frame 301 and an arm 306 with mounts for rotor blades. This top view only shows one arm, but one skilled in the art will understand that the rotor-based remote flying vehicle platform 300 may include two, three, four or more arms. This applies to each of the FIGS. 3-9.

Figure 4:
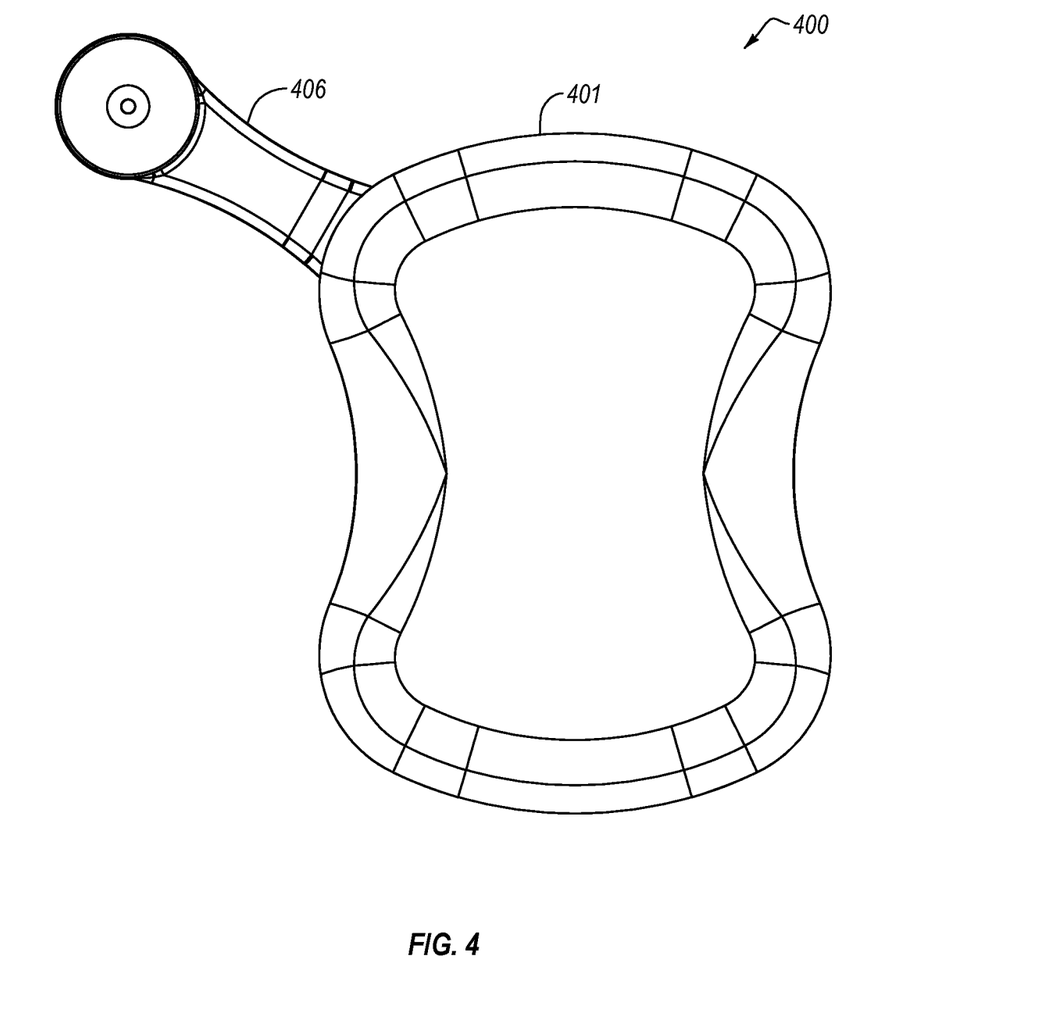
FIG. 4 illustrates a bottom view of an embodiment of a rotor-based remote flying vehicle platform.
Figure 5:
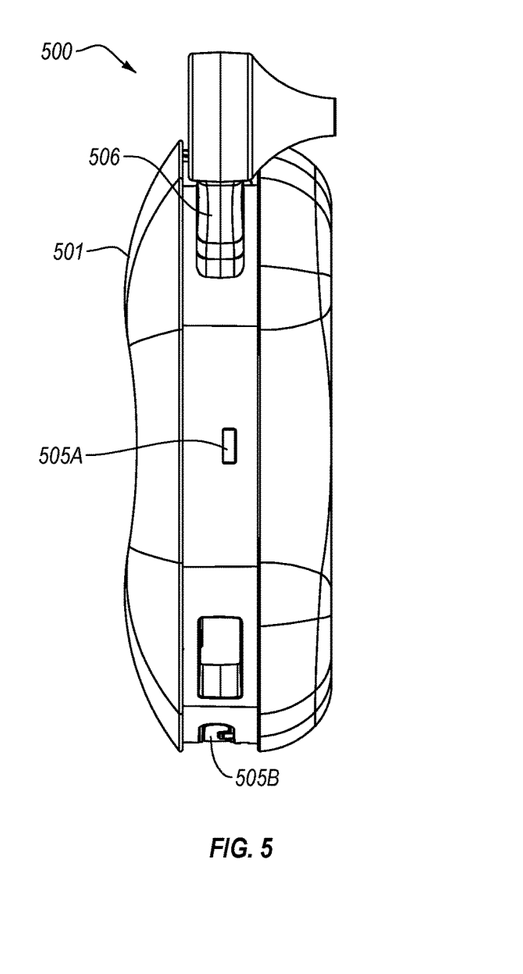
FIG. 5 illustrates a side view of an embodiment of a rotor-based remote flying vehicle platform in a vertical position.

FIG. 4 illustrates a bottom view of a rotor-based remote flying vehicle platform 400 with a central frame 401 and an arm 406. From this perspective, no communication ports are visible. In the side view of FIG. 5, however, communication ports 505A and 505B are visible on the central frame 501 of rotor-based remote flying vehicle platform 500. Below arm 506 is communication port 505A, and on the bottom surface is communication port 505B. In practice, these may be the same or different types of ports. Indeed, some platforms may have multiple of the same port, while other platforms may include many different types of ports. The communication ports may, for example, include (but are not limited to) universal serial bus (USB) ports, high-definition multimedia interface (HDMI) ports, Ethernet ports, digital visual interface (DVI) ports, or other standardized or proprietary ports. Each of these communication ports may interact with and be controlled by the control center 102 of FIG. 1.

Figure 6:
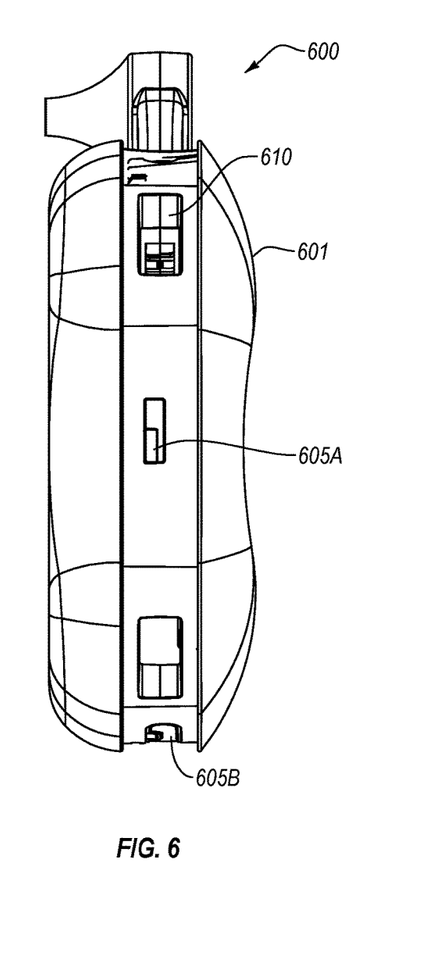
FIG. 6 illustrates an alternate side view of an embodiment of a rotor-based remote flying vehicle platform in a vertical position.
Figure 7:
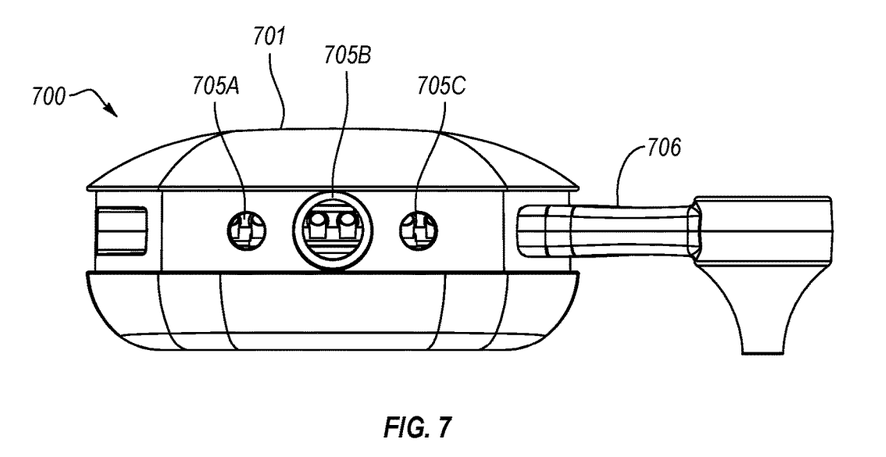
FIG. 7 illustrates a side view of an embodiment of a rotor-based remote flying vehicle platform in a horizontal position.

FIG. 6 illustrates an alternate side view of the rotor-based remote flying vehicle platform 600. The platform 600 shows the same communication port 605B as was shown in FIG. 5 (505B), but has a different port on the facing side, port 605A. The central frame 601 of platform 600 also has an arm connection port 610 that allows an arm to be connected to (or disconnected from) the central frame 601. FIG. 7 illustrates a side view of the rotor-based remote flying vehicle platform 700 in the horizontal position. The central frame 701 has three ports in the facing side including ports 705A, 705B and 705C, positioned between arms 706. Communication ports 705A and 705C may be the same type of port. Multiple communication ports may allow multiple functionality modules to be connected to the same side of the central frame 701.

Figure 8:
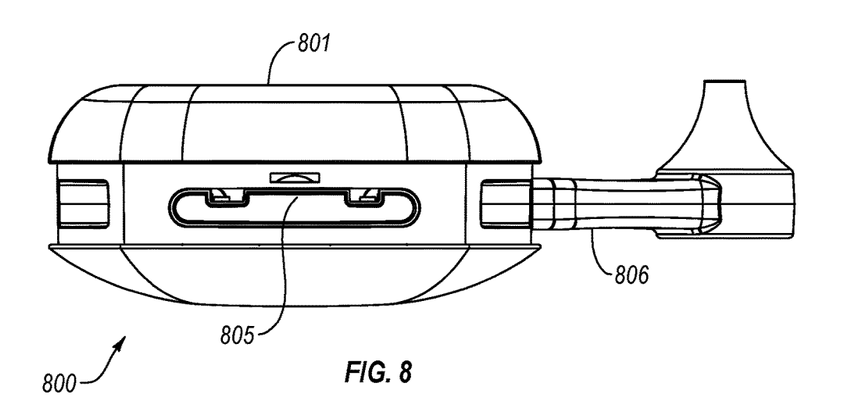
FIG. 8 illustrates an alternate side view of an embodiment of a rotor-based remote flying vehicle platform in a horizontal position.
Figure 9:
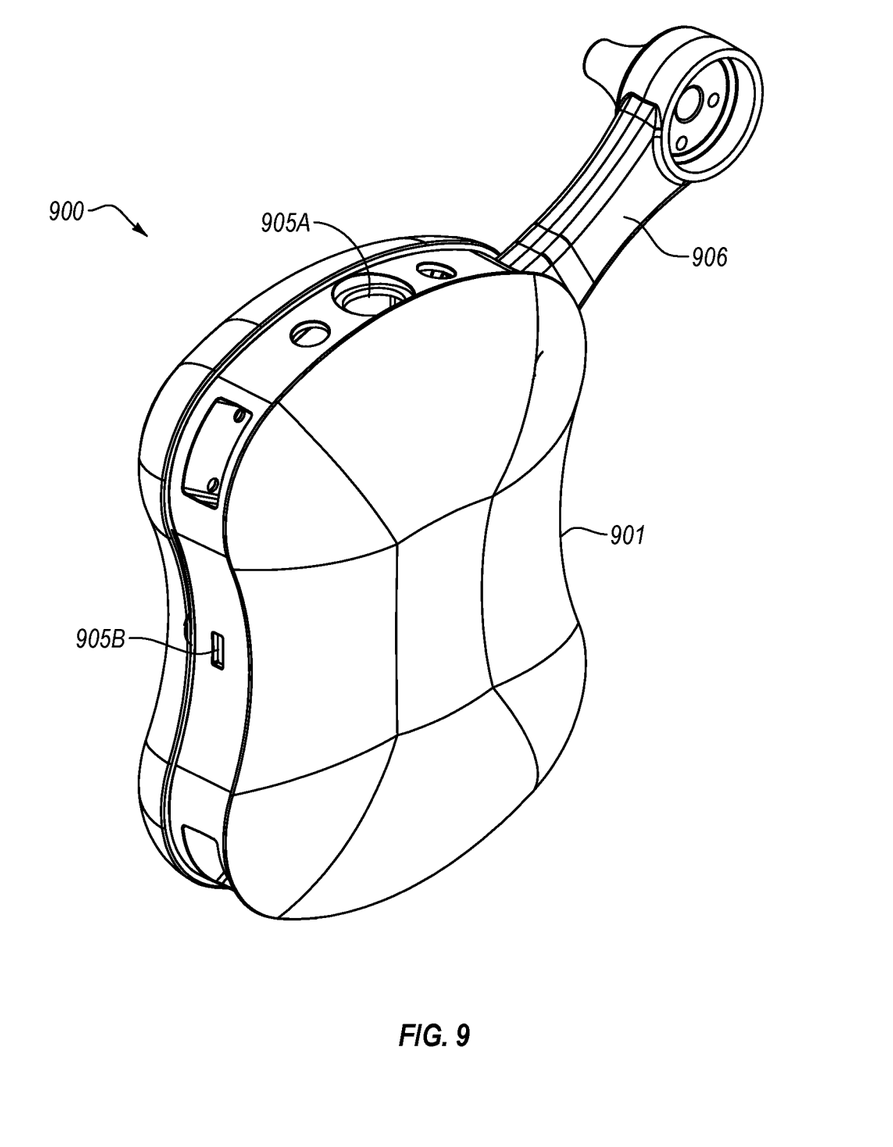
FIG. 9 illustrates a perspective view of an embodiment of a rotor-based remote flying vehicle platform.

Platform 800 of FIG. 8 illustrates a different type of communication port 805 built into the central frame 801 between platform arms 806. FIG. 9 is a perspective view of an embodiment that includes communication port types 905A and 905B positioned between arms 906 attached to the central frame 901. In each of these drawings, the ports are placed between platform arms. However, it should be noted that the communication ports may be placed on any surface of the rotor-based remote flying vehicle platforms, including the top surface or the bottom surface. Regardless of where the communication ports are placed, functionality modules may be designed to align with the central frame in a flush manner. In some case, functionality modules may be designed to wrap around a portion of the central frame so as to more evenly distribute weight on the frame. These concepts will be explained further below with regard to method 1000 of FIG. 10.

Figure 10:
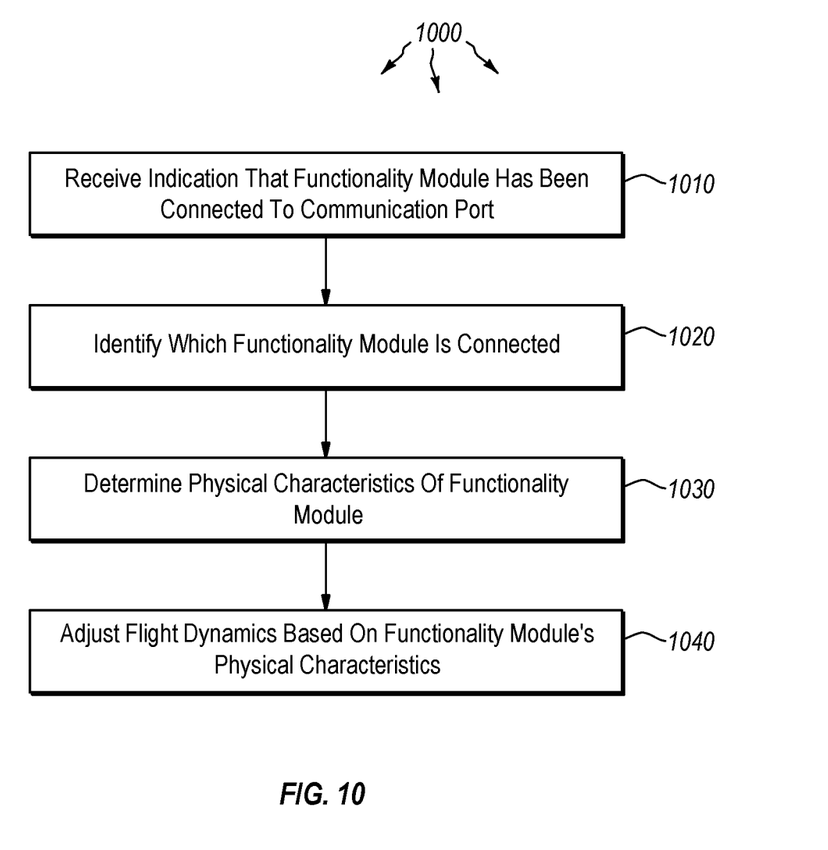
FIG. 10 illustrates a flowchart of an example method for controlling intra-flight dynamics of such rotor-based remote flying vehicles.

In view of the systems and architectures described above, methodologies that may be implemented in accordance with the disclosed subject matter will be better appreciated with reference to the flow chart of FIG. 10. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 10 illustrates a flowchart of a method 1000 for controlling intra-flight dynamics of a rotor-based remote flying vehicle. The method 1000 will now be described with frequent reference to the rotor-based remote flying vehicle platform 100 of FIG. 1.

Method 1000 includes receiving, at a control center, an indication that a functionality module has been connected to a communication port affixed to a central frame of the rotor-based remote flying vehicle (1010). For example, control center 102 of the rotor-based remote flying vehicle platform 100 may receive an indication that a functionality module 107 has been connected to communication port 105. Once an electrical connection has been made between the communication port 105 and the functionality module 107, the control center 102 can send and receive communications from the functionality module 107 through the communication interface 105.

Method 1000 next includes identifying which functionality module is connected to the communication port (1020). The control center may include a processor and memory, along with data storage. The processor of the control center 102 may identify the functionality module 107 by querying the module for an ID number or device type or other identifying information. Once received, the information can be matched against a database of known functionality modules, or the control center 102 can use a wireless radio to access remotely stored data related to the functionality module.

Using this data, the control center 102 determines one or more physical characteristics of the functionality module (1030), and then adjusts flight dynamics of the rotor-based remote flying vehicle 100 based on the physical characteristics of the functionality module (1040). As mentioned above, the physical characteristics of the functionality module may include its size (including height, width and depth), shape, weight, weight distribution, surface area, drag coefficient, or other information that may be useful in maintaining flight.

In some embodiments, adjusting flight dynamics of the rotor-based remote flying vehicle may include continually monitoring flight parameters of the rotor-based remote flying vehicle 100 and, based on information gathered during the monitoring, adjusting rotor speed for at least one rotor of the rotor-based remote flying vehicle. In such cases, the control center 102 may evaluate current flight parameters including position, heading, speed, orientation, wind speed, or other data. Using this data, the control center 102 may determine that the rotor speed for at least one of the rotors should be increased or decreased. Once the determination is made, the control center 102 may communicate with the motor (e.g. 103A) to increase or decrease power as needed. This determination may be made continually during flight so as to ensure that the rotor-based remote flying vehicle 100 flies as intended.

Additionally or alternatively, adjusting flight dynamics of the rotor-based remote flying vehicle may include continually monitoring flight parameters of the rotor-based remote flying vehicle and, based on information gathered during the monitoring, adjusting rotor tilt angle for at least one rotor of the rotor-based remote flying vehicle. Similar to the embodiment above where rotor speed is adjusted, tilt angle for the rotors may also be adjusted as needed. If the arms of the platform 100 include tilt-adjustable rotors, the tilt angle may be continually adjusted to propel the vehicle in a certain direction, or to counterbalance the effects of wind or a heavy functionality module that has been attached to one side of the vehicle.

In some case, the functionality module itself includes a processor, memory and/or data storage. When the functionality module is attached to the central frame 101, the control center may identify which functionality module is connected to the communication port by requesting and receiving identification information from a data storage module that is part of the functionality module. The data storage module may store information including a functionality module type identifier, as well as an indication of physical characteristics of the module. Determining physical characteristics of the functionality module may also include accessing identification information stored in the functionality module's data store and comparing it to a database of physical characteristics associated with functionality module. The database may store a list of physical characteristics associated with different types of modules.

Still further, the identification information itself may include an indication of physical characteristics. In such cases, determining the physical characteristics of the functionality module may include accessing and interpreting the identification information, as the identification information includes an indication of physical characteristics of the functionality module. Thus, it can be seen that the identity and physical traits of a functionality module may be ascertained by the control center 102 in a variety of different ways. The control center 102 may then use this data to control the flight dynamics of the rotor-based remote flying vehicle platform 100. The control center may adjust flight parameters differently for different types of flying vehicle. Indeed, flight parameters will be different for platforms with one, two, three or four rotors.

For instance, in one example, a quadrotor is provided. The quadrotor has a central frame 101, wherein itself includes a control center 102 that is configured to control motors (e.g. 103A-D) mounted to the quadrotor 100. The central frame 101 also includes a communication port 105 that is configured to interface with functionality modules 107. The communication port is communicably connected to the control center 102 so as to allow communication between the control center and the functionality modules. The control center is also configured to dynamically adjust flight dynamics for the quadrotor based on physical characteristics of the functionality modules 107, depending on which modules are attached to the quadrotor.

The quadrotor 100 further includes four arms (106A-D) that are connected to the central frame 101, each of which extends outward from the central frame. The quadrotor 100 also includes four motors (103A-D) respectively mounted to four arms (106A-D), where the four motors are in communication with the control center 102. The control center 102 can individually control each motor to vary rotor speed (and tilt angle when such is available). The quadrotor determines which functionality modules are connected to it and, based on the determination, modifies initial flight parameters in preparation for takeoff. Once airborne, the control center 102 monitors flight parameters and dynamically adjusts flight dynamics including increasing or decreasing motor speed of at least one of the four motors. Adjusting flight dynamics may also include dynamically adjusting tilt angle of the motors during flight.

As shown in the Figures, the central frame 101 may be hour-glass shaped, or may take on a different shape such as round, rectangular, triangular or square. In one embodiment, the platform 100 is substantially square-shaped and includes four communication ports 105, where each side of the central frame has a communication port. In some cases, each of these four communication ports may have a functionality module attached thereto. The control center 102 is then capable of adjusting flight dynamics for the quadrotor 100 based on the physical characteristics of each of the four functionality modules attached to the four communication ports of the central frame. By combining the physical characteristic data for each of the functionality modules, and by determining where each is placed on the central frame, the control center may adjust the flight dynamics of the platform so as to maintain a smooth flight in the desired direction or course.

Accordingly, a rotor-based remote flying vehicle platform is described herein which has communication ports that allow modular functionality to be added to the platform. Moreover, methods are provided which control intra-flight dynamics of such rotor-based remote flying vehicles.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A rotor-based remote flying vehicle platform comprising:
   a central frame, wherein the central frame includes:
      a control center that is mounted to the central frame, the control center configured to control motors mounted to the vehicle platform;
      at least one communication port physically integrated into the central frame, the at least one communication port configured to interface with one or more functionality modules, the communication port being communicably connected to the control center;
      at least one functionality module connected to the communication port, the functionality module having a plurality of physical characteristics including at least one of weight, size or shape;
      at least a first arm that is connected to the central frame and extends outward; and
      at least a first motor mounted to the first arm, wherein the first motor is in communication with the control center;
   wherein the control center is configured to:
      electronically receive identification information from the at least one functionality module, wherein the identification information includes physical characteristics of the at least one functionality module;
      adjust one or more flight dynamics of the rotor-based remote flying vehicle platform based on the physical characteristics of the at least one functionality module received in the identification information.

2. The rotor-based remote flying vehicle platform of claim 1, wherein adjusting flight dynamics based on physical characteristics of the functionality module includes altering motor speed for the first motor.

3. The rotor-based remote flying vehicle platform of claim 1, further comprising second, third and fourth motors mounted to second, third and fourth arms, respectively, each arm being connected to the central frame and extending outwards, wherein adjusting flight dynamics based on physical characteristics of the functionality module includes altering motor speed for at least two of the first, second, third and fourth motors.

4. The rotor-based remote flying vehicle platform of claim 1, wherein the at least one functionality module connected to the communication port is mounted substantially flush with the central frame.

5. The rotor-based remote flying vehicle platform of claim 1, wherein the functionality module comprises at least one of an infrared camera, a sonar system, a mesh network controller, a wireless radio, a spare battery, and a digital camera.

6. The rotor-based remote flying vehicle platform of claim 1, wherein the communication port comprises at least one of a USB port, an HDMI port, an Ethernet port, a DVI port, or a proprietary port.

7. A method for controlling intra-flight dynamics of a rotor-based remote flying vehicle, the method comprising:
receiving, at a control center that is mounted on the flying vehicle, an indication that a functionality module has been connected to a communication port affixed to a central frame of the rotor-based remote flying vehicle;
receiving, at the control center, an electronic communication from the functionality module, wherein the electronic communication comprises identification information relating to the functionality module, wherein the identification information includes physical characteristics of the functionality module;
and
adjusting one or more flight dynamics of the rotor-based remote flying vehicle based on at least one of the physical characteristics of the functionality module, wherein adjusting one or more flight dynamics of the rotor-based remote flying vehicle includes the following:
continually monitoring flight parameters of the rotor-based remote flying vehicle.

8. The method of claim 7, wherein adjusting one or more flight dynamics of the rotor-based remote flying vehicle includes the following:
based on information gathered during the monitoring, adjusting rotor speed for at least one rotor of the rotor-based remote flying vehicle.

9. The method of claim 7, wherein adjusting one or more flight dynamics of the rotor-based remote flying vehicle includes the following:
based on information gathered during the monitoring, adjusting rotor tilt angle for at least one rotor of the rotor-based remote flying vehicle.

10. The method of claim 7, wherein identifying which functionality module is connected to the communication port includes requesting and receiving identification information from a data storage module in the functionality module.

11. The method of claim 10, wherein determining one or more physical characteristics of the functionality module includes accessing the identification information and comparing it to a database of physical characteristics associated with the functionality module.

12. The method of claim 11, wherein determining one or more physical characteristics of the functionality module includes accessing and interpreting the identification information, the identification information including an indication of physical characteristics of the functionality module.

* * * * *